United States Patent [19]

Nagano

[11] Patent Number: 4,604,078
[45] Date of Patent: Aug. 5, 1986

[54] THREE-STAGE SPEED CHANGE FRONT DERAILLEUR

[75] Inventor: Masashi Nagano, Izumi, Japan

[73] Assignee: Shimano Industrial Company Limited, Osaka, Japan

[21] Appl. No.: 714,914

[22] Filed: Mar. 22, 1985

[30] Foreign Application Priority Data

Mar. 29, 1984 [JP] Japan .................................. 59-63013

[51] Int. Cl.⁴ ............................................. F16H 7/00
[52] U.S. Cl. ........................................ 474/80; 474/82
[58] Field of Search .................................... 474/80, 82

[56] References Cited

U.S. PATENT DOCUMENTS 4,078,444  3/1978  Huret ..................................... 474/80
4,424,048  1/1984  Shimano ................................. 474/82
4,452,593  6/1984  Coue ..................................... 474/80

Primary Examiner—James A. Leppink
Assistant Examiner—Frank McKenzie
Attorney, Agent, or Firm—Stevens, Davis, Miller & Mosher

[57] ABSTRACT

A three-stage speed change front derailleur which shifts a driving chain to one of three front chain gears of different diameter to thereby change the speed includes a linkage mechanism comprising a fixing member, a pair of linkage members and a movable member provided with an inner guide plate and an outer guide plate, the movable member pivotally supporting a shift plate which is positioned below the inner guide plate, and which serves to shift the chain from a smaller diameter chain gear to a middle diameter chain gear, and is pivoted to the movable member in relation of being movable away from a larger diameter chain gear.

5 Claims, 5 Drawing Figures

THREE-STAGE SPEED CHANGE FRONT DERAILLEUR

FIELD OF THE INVENTION

This invention relates to a front derailleur used mainly for a bicycle, and more particularly to a three-stage speed change front derailleur which shifts a driving chain to one of three front chain gears different in diameter.

BACKGROUND OF THE INVENTION

Generally, a front derailleur for a bicycle is provided with a movable member which has inner and outer guide plates disposed radially outwardly from the addendum circle of the front chain gear and in the vicinity of the entrance of a driving chain engageable with the chain gear. The movable member is supported through a pair of linkage members to a fixing member in relation of being movable axially of the front gear, so that the inner surface of the inner guide plate is brought into contact with one side surface of the chain carried by a smaller diameter chain gear and the chain disengages therefrom and is urged toward a larger diameter chain gear so as to be shifted thereto from the smaller diameter chain gear, while, the inner surface of outer guide plate is brought into contact with one side surface of the chain, so that the chain is urged toward the smaller diameter chain gear and disengages from the larger diameter chain gear, thereby being shifted therefrom to the smaller diameter chain gear.

Each of the guide plates is formed at the lower edge thereof in a circular arc and they are mounted to the bicycle frame such that the lower edge of outer guide plate is spaced in a proper interval from the larger diameter chain gear.

When the conventional two-stage speed change front derailleur is used for a three-stage speed change derailleur, especially when the chain is shifted from the smaller diameter chain gear to a middle diameter chain gear, the inner guide plate shifts too much radially outwardly from each tooth crest of the middle diameter chain gear to enlarge a distance between the chain urging portion at the inner guide plate and the chain engaging point at the middle diameter chain gear. As a result, the chain to be shifted deflects excessively to cause a larger movement of the inner guide plate, and in turn a longer operating stroke of the inner guide plate to that extent, thereby lowering the speed change efficiency.

As a countermeasure for the above, the inner guide plate, when shifted toward the middle diameter chain gear, is kept at the lower edge in a proper interval from each tooth crest of the same, thereby enabling a good speed change efficiency to be obtained. In this case, however, the lower edge of the inner guide plate is positioned radially inwardly from the addendum circle of the larger diameter chain gear.

At this time, the chain is pressed hard to the inner surface of the larger diameter chain gear, resulting in that the chain is jammed between the inner guide plate and the larger diameter chain gear, thereby occasionally making chain shifting impossible.

SUMMARY OF THE INVENTION

A main object of the invention is to provide a front derailleur which is provided with a shift plate separate from the inner and outer guide plates, the shift plate serving to shift a driving chain from a smaller diameter chain gear to a middle diameter chain gear and improve the speed change efficiency, and also serving to move away from the larger diameter chain gear when the chain is shifted thereto from the middle diameter chain gear, thereby allowing the inner guide plate to shift the chain to the larger diameter chain gear.

Another object of the invention is to provide a front derailleur which, even when subjected to a greater resistance against speed change because the chain is halted, can previously carry out a speed change operation and shift the chain to the preset speed change stage when the resistance decreases.

The front derailleur of the invention is a three-stage speed change front derailleur which shifts the driving chain to one of three front gears different in diameter, which comprises a linkage mechanism comprising a fixing member, a pair of linkage members, and a movable member provided with inner and outer guide plates. A shift plate is positioned below the inner guide plate and serves to shift the chain from the smaller diameter chain gear to the middle diameter one. The shift plate is pivoted to the movable member in relation of moving away from the speed change operating position for the middle diameter chain gear with respect to the larger diameter gear, and also is biased toward the speed change operating position for the middle diameter chain gear, thereby improving the speed change efficiency to shift the chain by use of the shift plate from the smaller diameter chain gear to the middle diameter one and also ensuring the chain shifting by use of the inner guide plate from the middle diameter chain gear to the larger diameter gear.

This invention is characterized in that the shift plate is separate from the inner and outer guide plates and serves to shift the driving chain from the smaller diameter chain gear to the middle diameter gear, with the shift plate having no relation to the chain shifting therefrom to the larger diameter chain gear, whereby the inner guide plate only performs such chain shifting.

Furthermore, the invention provides, at the movable member, a spring biasing means to bias the shift plate to the speed change operating position so that when the chain is stationary to increase the resistance against speed change, the spring is adapted to be overcome by the resistance and deflects, whereby the chain can be shifted from the smaller diameter chain gear to the middle diameter chain gear by use of the shift plate even when the chain is halted.

These and other objects of the invention will be seen by reference to the detailed description, taken in connection with the accompanying drawings.

DETAILED DESCRIPTION OF THE INVENTION

Figure 1:
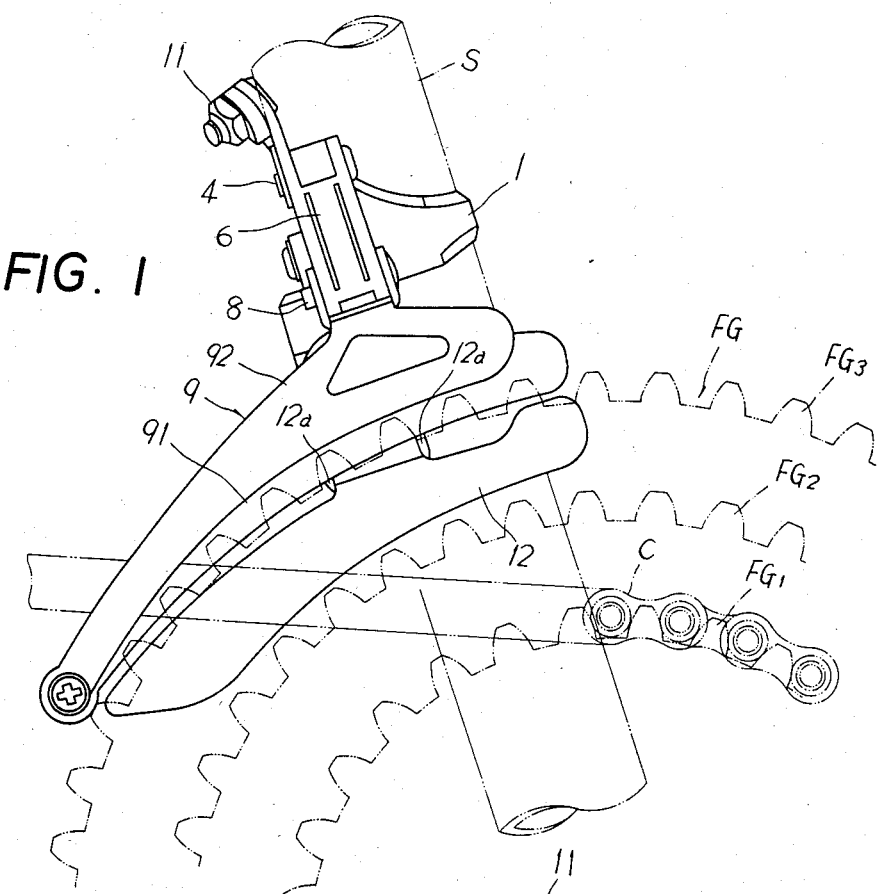
FIG. 1 is a front view of an embodiment of a front derailleur of the invention.

A front derailleur is shown which comprises a fixing member 2 fixed to a seat tube S at the bicycle through a tightening band 1, a pair of linkage members 5 and 6 pivoted to the fixing member 2 through pivot pins 3 and 4, and a movable member 9 provided with an inner guide plate 91 and an outer guide plate 92 and supported swingably to the utmost ends of linkage members 5 and 6 through pivot pins 7 and 8, these four members constituting a linkage mechanism A. A return spring 10 is interposed between the movable member 9 and the linkage member 5 so that the movable member 9 is biased toward a smaller diameter gear $FG_1$ so as to normally stop at the position corresponding thereto, thus in condition of the so-called low normal. The linkage mechanism A is transformed through a pull of a control wire (not shown) fixed to the linkage member 6 through a fixture 11 to thereby move forwardly the movable member 9 to the position corresponding to the middle diameter gear $FG_2$ or larger diameter gear $FG_3$, the control wire being loosened to return the same to the position corresponding to the smaller diameter gear $FG_1$ or middle diameter one $FG_2$.

The inner and outer guide plates 91 and 92 each are formed in a circular arc along the addendum circle of larger diameter gear $FG_3$ and oppose one another with an interval larger in width than the driving chain C, thereby enabling the chain C to be movable between both the guide plates 91 and 92.

A shift plate 12 is pivoted to the movable member 9 at the inner guide plate 91 side, is positioned below the plate 91, serves to shift the chain C from the smaller diameter gear $FG_1$ to the middle diameter gear $FG_2$, moves away from the speed change operating position therefor with respect to the larger diameter gear $FG_3$, and is biased toward the position corresponding to the middle diameter gear $FG_2$ through a shifting spring 13 interposed between the shift plate 12 and the movable member 9 or linkage member 5 or 6.

In this construction, the shift plate 12 operates together with the inner guide plate 91 to shift the chain from the smaller diameter gear $FG_1$ to the middle diameter gear $FG_2$ and swings with respect to the inner guide plate 91 so that it has no affect on shifting the chain C from the middle gear $FG_2$ to the larger diameter gear $FG_3$. The shift plate 12 shown in the drawings is formed in a circular arc along the addendum circle of gear $FG_2$ and provided at the upper end of lengthwise intermediate portions with a pair of mounting segments 12a extending outwardly upwardly therefrom, which are pivoted to the linkage member 5 through the pivot pin 7 to hold the shift plate 12 below the inner guide plate 91 in relation of substantially aligning the inner surface of the shift plate 12 with that of inner guide plate 91. Also, stoppers 12b which abut against the outer surface of inner guide plate 91 are provided at the mounting segments 12b respectively, thereby regulating the shift plate 12 to be swingable outwardly only from the inner surface of inner guide plate 91.

Also, the shift spring 13 is wound around a spindle 14 provided at an intermediate portion of linkage member 5 and abuts at one end against the pivot pin 3 and at the other end against a spring seat 12c provided at the shift plate 12, thereby biasing the shift plate 12 to move together with the inner guide plate 91.

Next, explanation will be given of operation of the front derailleur constructed as described above.

Figure 2:
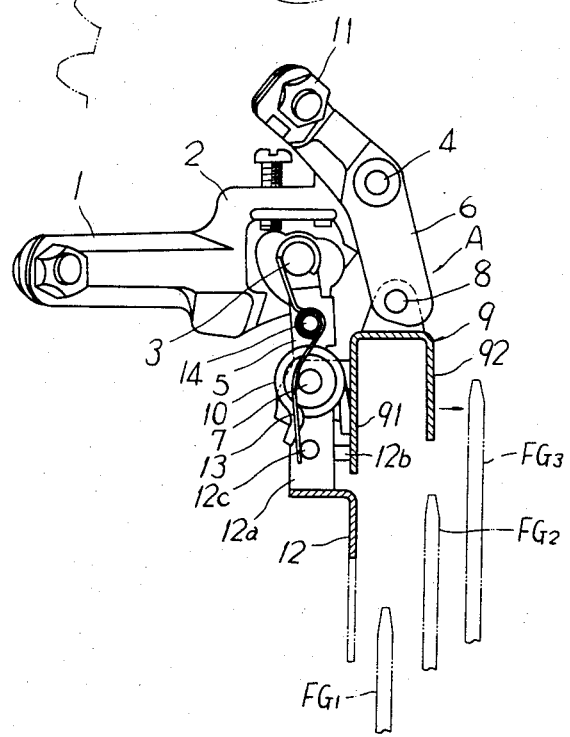
FIG. 2 is a partially sectional side view of the FIG. 1 embodiment.
Figure 3:
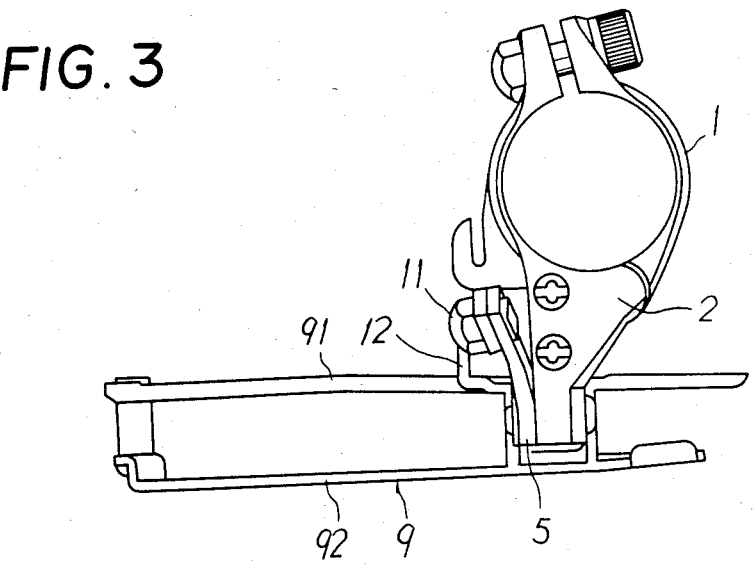
FIG. 3 is a plan iew of the same.

For shifting the chain C from the smaller diameter gear $FG_1$ to the middle diameter gear $FG_2$, the control wire is pulled to transform the linkage mechanism A against the return spring 13 and move the movable member 9 toward the position corresponding to the middle diameter gear $FG_2$ in the direction of the arrow in FIG. 2.

In this case, the shift plate 12 comes at its inner surface into contact with one side of chain C so as to urge together with the inner guide plate 91 the chain C toward the middle diameter gear $FG_2$, whereby the chain C is caught and raised by the edge of tooth crest at the gear $FG_2$ to engage therewith.

Thus, the shift plate 12 urging the chain C toward middle diameter gear $FG_2$ can define a proper distance between the chain urging portion of shift plate 12 and the engaging point of middle diameter gear $FG_2$ with the chain C, thereby enabling the speed change at a constant operating stroke and improving the speed change efficiency.

Figure 4:
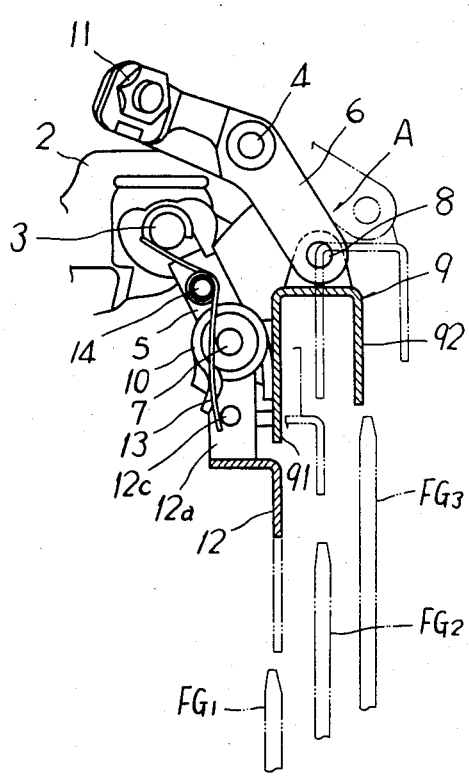
FIGS. 4 and 5 are views explanatory of the operation of the same.

Next, when the chain C is shifted from the midde diameter gear $FG_2$ to the larger diameter gear $FG_3$, the control wire is further pulled to move the movable member 9 toward the position corresponding to the larger diameter gear $FG_3$ as shown by the chain line in FIG. 4, at which time the chain C moves radially outwardly from the middle diameter gear $FG_2$ and is urged by the shift plate 12 and inner plate 91 toward the larger diameter gear $FG_3$.

At this time, the shift plate 12, whose lower edge is positioned radially inwardly from the addendum circle of larger diameter gear $FG_3$, cannot further move after the chain C contacts at one side thereof with the larger diameter gear $FG_3$, but only the inner guide plate 91, whose lower edge is positioned radially outwardly of the same, can move to further urge the chain C to the gear $FG_3$. Hence, the chain C is caught and raised by the edge of tooth crest of gear $FG_3$ and engages therewith, at which time the shift plate 12 swings against the shift spring 13 to move away from the gear $FG_3$, not to put the chain C between the shift plate 12 and the larger diameter gear $FG_3$, thereby not hindering the rise of chain C. In this case, a proper distance also can be defined between the chain urging portion and the chain engaging point at the gear $FG_3$, thereby changing the bicycle speed at a constant stroke to improve the speed change efficiency.

In addition, in the above-mentioned embodiment, the lower edge of inner guide plate 91 may not be defined to be positioned radially outwardly from the addendum circle of larger diameter gear $FG_3$, but may be set in a desired position.

In other words, the chain C urged to the larger diameter gear $FG_3$ is not caught between the larger diameter gear $FG_3$ and the inner guide plate 91 which is set to keep its lower edge radially outwardly from the addendum circle of gear $FG_3$, but the lower edge of inner guide plate 91 may be positioned in the usual manner such that a lengthwise rear half portion of inner plate 91 is set as above-mentioned, while, a front half portion may be set radially inwardly of the addendum circle of the same.

In this case, the chain C urged to the gear $FG_3$ may encroach between the larger diameter gear $FG_3$ and the lower edge of inner guide plate 91, which is remedied by quenching the inner guide plate 91 to raise its hardness and by reducing its friction coefficient.

Also, when the chain C is stationary due to no pedalling and the speed change is intended to be carried out from the smaller diameter gear $FG_1$ to the middle diameter gear $FG_2$, the saver function of shift plate 12 to be discussed below can change the bicycle speed.

Figure 5:
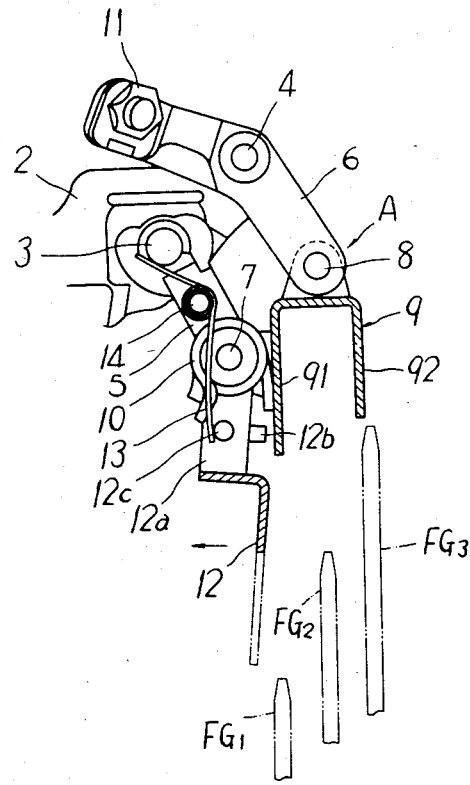

In this case, the shift spring 13 is set to have a spring force larger than the resistance against speed change from the gear $FG_1$ to $FG_2$ during the pedalling and smaller than that during a halt of chain C. Since the chain engaging with the smaller diameter gear $FG_1$ cannot move axially of the front gear as long as the gear $FG_1$ does not rotate, the linkage mechanism A is transformed following the speed change operating as shown in FIG. 5 to move the movable member 9 toward the middle diameter gear $FG_2$ and the shift plate 12 swings against the shift spring 13 away from the inner guide plate 91 in the direction of the arrow, thereby conserving energy at the shift spring 13. Then, when the chain C is movable axially of the front gear due to travel of chain caused by pedalling, the shift plate 12 shifts toward the middle diameter gear $FG_2$ due to the energy conserved in the shift spring 13, thereby urging the chain C toward the gear $FG_2$ for engagement therewith.

Also, the chain C is shifted, in a conventional manner, from the larger diameter gear $FG_3$ to the middle diameter gear $FG_2$, or therefrom to the smaller diameter gear $FG_1$, by urging the chain C by the outer guide plate 92.

Alternatively, the shift plate 12 may directly be supported to the movable member 9, or may be supported to the pivot pin 8.

Also, the shift plate 12 may alternatively be formed as a whole or in part of a spring steel plate and a flexible portion is provided thereto, and may be assembled to the movable member 9 in condition of somewhat deflecting the flexible portion. Or, the shift spring 13 may be used in common with the return spring 10.

Also, the shift plate 12 may alternatively be disposed inwardly from the inner surface of inner guide plate 91.

While a preferred embodiment of the invention has been described using specific terms, such description is for illustrative purpose only, and it is to be understood that changes and variations may be made without departing from the spirit or scope of the invention which is defined in the following claims.

What is claimed is:

1. A three-stage speed change front derailleur for shifting a driving chain to one of three speed change stages respectively corresponding to three front chain gears of different diameter comprising: a fixing member, a pair of linkage members, and a movable member provided with an inner guide plate, an outer guide plate and a shift plate, said shift plate functioning with said inner guide plate to shift said driving chain to a middle speed change stage and being positioned below said inner guide plate so as to serve to shift said driving chain from a smaller diameter front chain gear to a middle diameter front chain gear, said shift plate being pivoted to said movable member in relation of being swingable between a speed change operating position where said chain can be shifted by said shift plate to said middle diameter chain gear and a position where said shift plate moves away from said speed change operating position as said movable member moves from a position corresponding to said middle speed change state toward a position of shifting a chain to a larger diameter front chain gear, said front derailleur having biasing means for biasing said shift plate toward said speed change operating position.

2. A three-stage speed change front derailleur as in claim 1, wherein said shift plate moves away from said speed stage operating position by means of contact of said chain with said larger diameter chain gear as said movable member moves toward said position of shifting a chain to said larger diameter chain gear.

3. A three-stage speed change front derailleur as set forth in claim 2, wherein said shift plate is provided with mounting segments through which said shift plate is mounted to said movable member, said mounting segments having stoppers abutting against said inner guide plate to set the speed change operating position.

4. A three-stage speed change front derailleur as set forth in claim 2, wherein said shift plate is pivoted to a pivot pin pivoting said movable member to said linkage members.

5. A three-stage speed change front derailleur as set forth in claim 2, wherein a spring force of said biasing means is set larger than a resistance against speed change when said chain is moving and is shifted from said smaller diameter front chain gear to said middle diameter front chain gear and smaller than a resistance against speed change when said chain is not moving.

* * * * *

REEXAMINATION CERTIFICATE (956th)
United States Patent [19]

Nagano

[11] B1 4,604,078
[45] Certificate Issued Dec. 6, 1988

[54] THREE-STAGE SPEED CHANGE FRONT DERAILLEUR

[75] Inventor: Masashi Nagano, Izumi, Japan

[73] Assignee: Shimano Industrial Company Limited, Osaka, Japan

Reexamination Request:
No. 90/001,519, May 24, 1988

Reexamination Certificate for:
Patent No.: 4,604,078
Issued: Aug. 5, 1986
Appl. No.: 714,914
Filed: Mar. 22, 1985

[30] Foreign Application Priority Data
Mar. 29, 1984 [JP] Japan .................. 59-63013

[51] Int. Cl.⁴ ............................. F16H 7/00
[52] U.S. Cl. ............................. 474/80; 474/82
[58] Field of Search ..................... 474/78–82

[56] References Cited
U.S. PATENT DOCUMENTS

| 4,078,444 | 3/1978 | Huret | 474/82 |
| 4,237,743 | 12/1980 | Nagano | 474/82 |
| 4,479,787 | 10/1984 | Bonnard | 474/82 |

FOREIGN PATENT DOCUMENTS

| 0060797 | 9/1982 | European Pat. Off. |
| 2340852 | 9/1977 | France. |
| 2405861 | 5/1979 | France. |
| 2036895 | 7/1980 | United Kingdom. |

*Primary Examiner*—Thuy M. Bui

[57] ABSTRACT

A three-stage speed change front derailleur which shifts a driving chain to one of three front chain gears of different diameter to thereby change the speed includes a linkage mechanism comprising a fixing member, a pair of linkage members and a movable member provided with an inner guide plate and an outer guide plate, the movable member pivotally supporting a shift plate which is positioned below the inner guide plate, and which serves to shift the chain from a smaller diameter chain gear to a middle diameter chain gear, and is pivoted to the movable member in relation of being movable away from a larger diameter chain gear.

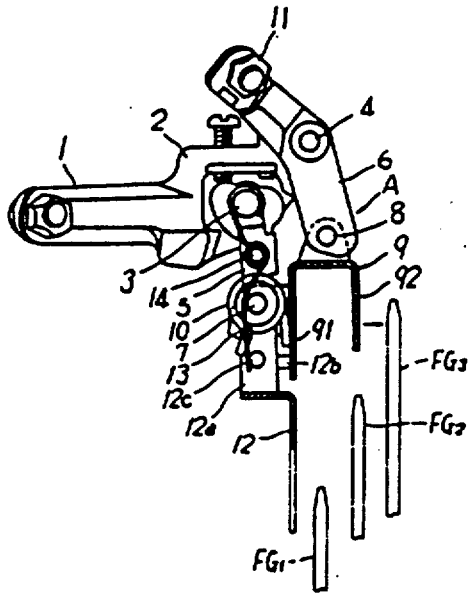

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-5 is confirmed.

* * * * *